United States Patent [19]

Mohn

[11] Patent Number: 5,015,391

[45] Date of Patent: May 14, 1991

[54] SILICATE COAGULANT AID FOR TREATMENT OF OILY WASTEWATERS

[75] Inventor: Michael F. Mohn, Levittown, Pa.

[73] Assignee: Betz Laboratories, Inc., Trevose, Pa.

[21] Appl. No.: 449,621

[22] Filed: Dec. 12, 1989

[51] Int. Cl.$^5$ .................................................. C02F 1/56
[52] U.S. Cl. .................................... 210/708; 210/725; 210/728; 210/736; 252/329
[58] Field of Search ............... 210/708, 725, 727, 728, 210/735, 736; 252/329, 344

[56] References Cited

U.S. PATENT DOCUMENTS

| | | | |
|---|---|---|---|
| 3,951,330 | 4/1976 | Tonkyn et al. | 210/736 |
| 3,977,969 | 8/1976 | Zall | 210/40 |
| 4,013,555 | 3/1977 | Davis | 210/725 |
| 4,059,515 | 11/1977 | Fowler et al. | 210/736 |
| 4,098,694 | 7/1978 | Perlaky | 210/59 |
| 4,120,815 | 10/1978 | Raman | 210/708 |
| 4,637,824 | 1/1987 | Pominville | 55/85 |
| 4,668,403 | 5/1987 | Walterick et al. | 210/728 |
| 4,800,039 | 1/1989 | Hassick et al. | 252/181 |
| 4,853,132 | 1/1989 | Merrell et al. | 210/712 |

FOREIGN PATENT DOCUMENTS

| | | | |
|---|---|---|---|
| 2507271 | 12/1975 | Fed. Rep. of Germany | 210/708 |
| 226481 | 8/1985 | German Democratic Rep. | 210/708 |

Primary Examiner—Peter Hruskoci
Attorney, Agent, or Firm—Alexander D. Ricci; Gregory M. Hill

[57] ABSTRACT

A method for treating emulsified oil contaminants in the wastewater effluent of industrial and food processing operations. Cationic polymers and silicate ions are found to effectively coagulate the oily particles to facilitate removal from the water.

1 Claim, No Drawings

SILICATE COAGULANT AID FOR TREATMENT OF OILY WASTEWATERS

FIELD OF THE INVENTION

The present invention relates to a method of treating water contaminated with oily waste. The oily wastewater is a by-product of industrial and food processing operations.

BACKGROUND OF THE INVENTION

Wastewater effluent from certain industrial processing contains minor quantities of oil. Such operations include the coiled metal and food processing industries. The oil discharged into the effluent wastewater has generally been "washed" from the primary processing operation by soaps and surfactants. Consequently, it is primarily in the form of emulsified, randomly dispersed, minute negatively charged particles and is generally not in the form of an oily layer on the surface of the water.

Traditional methods used to remove the oil waste include the use of aluminum containing compounds, such as aluminum sulfate. The soluble $Al^{+3}$ ion from these compounds reacts with the aqueous medium to form a precipitate of aluminum hydroxide. This precipitate contains the oil contaminant, the combination of which is referred to as sludge.

Additionally, in the processing of food products, it is frequently desired to reuse the waste oils and fats as additives to the food given to livestock. However, if aluminum products are used to remove the oils and fats, it is possible that the livestock may become ill. This either limits the use of treatments with aluminum compounds or negates the use of recycled oils and fats.

Where the emulsion is especially troublesome, such as in the steel coil and container industry, acid, e.g., $H_2SO_4$, may be required as an emulsion breaker. Disadvantages of adding $H_2SO_4$ to the aqueous system include the increased safety risk due to operator handling, the addition of lime to neutralize the system pH after the addition of acid and the formation of a calcium sulfate precipitate which adds bulk to the sludge solids.

PRIOR ART

Conventional treatment programs for the removal of oil waste from an aqueous environment are exemplified by the following patents. Perlaky, U.S. Pat. No. 4,098,694, discloses compositions and methods for dispersing oil films in the wastewater of industrial processing. It teaches the use of non-ionic dispersants, such as polyalkylene glycol ethers, fatty acid condensates of an alkanol amine, polycarboxylic acid esters, including mixtures thereof and water insoluble oxygenated organic compounds, such as oxo alcohols.

High molecular weight polymers, such as polyethylene oxide and polyacrylamide, are disclosed in U.S. Pat. No. 3,977,969, Zall, for utility in clearing oil spills. These compounds coagulate the oil thereby rendering it capable of being skimmed off the surface of the water.

Hassich et al., U.S. Pat. No. 4,800,039, teach the use of compositions comprised of aluminum chlorohydrate and either a water soluble polyamine or water soluble dialkyl diallyl ammonium polymers. This treatment is directed toward low-turbidity, low alkalinity waters.

The addition of silicates to an aqueous medium to detackify overspray paints in a paint spray booth wash water system is disclosed in U.S. Pat. No. 4,637,824, Pominville. The silicate is added to adjust the wash water pH to between 7.0 and 12.0. Amphoteric metal salts and a polydiallyl dimethyl ammonium halide are added to detackify the paint.

Merrell, et al., U.S. Pat. No. 4,853,132, disclose that the combination of various cationic polymers with inorganic anions, including silicates, results in effective paint detackification. The polymer and anion are added to the paint spray booth wash water system before the introduction of overspray paint in order to allow for formation of a turbid precipitate which then adsorbs the particles of overspray paint.

GENERAL DESCRIPTION OF THE INVENTION

The present invention is directed toward resolving a specific problem in the technology of wastewater treatment. Within the art of treating wastewater contaminated with oil are specific problems relating to treating tiny droplets of oil comprising an oil-in-water emulsion. These tiny emulsified droplets of oil result from the industrial processing of steel coil and containers as well as the processing of certain food products.

The present invention comprises adding to the oil contaminated wastewater, a combination of a cationic polymer and an inorganic silicate. The polymer/silicate blend reacts with the oil droplets to form an insoluble precipitate which may then be removed from the water by various conventional means.

DETAILED DESCRIPTION OF THE INVENTION

This invention covers a novel method of treating oily wastewaters. It comprises adding an organic cationic polymer coagulant and silicate ion to industrial and food processing effluent wastewater which contains tiny emulsified oil particles.

The cationic polymer is added to the oil contaminated wastewater in an amount sufficient to coagulate the tiny oil particles. Concentrations may range from 1 to 10,000 ppm active polymer. However, most treatments require from 10 to 300 ppm active polymer.

The silicate ion may be added either concurrent with, subsequent to or prior to the addition of the cationic polymer. This determination depends upon many factors, including rate of coagulation, operator accessibility, state of agitation of the aqueous medium and effectiveness of the polymer requiring either concurrent or subsequent silicate addition. The addition parameters must be determined based on the specific conditions present in each aqueous system treated for oil contamination. The silicate ion is added in a ratio of 1:1 to 1:20, based on the concentration of active cationic polymer to silicate ion. The silicate concentration is between about 10 ppm and 4000 ppm.

The active water soluble or water dispersible cationic polymers of the present invention may be described as being of medium to low molecular weight, as having a high charge density, cross-linked or linear, condensation or addition polymers. The molecular weight range active in this invention may be between about 1,000 and 600,000 average molecular weight. The key criterion, however, is that the polymer is water soluble. The charge densities, as determined by the PVSK Colloid Titration Method (H. Terayama, Kayaku no Kenkya, Vol. 1, p. 75, 1948; H. Terayama, Kayaku no Kenkya, Vol. 4, p. 31, 1949; R. Senju, "Koroido Tekiteiho", Nankodo, Tokyo, 1969), are active in the range of about 1.5 to 12. meq/g active polymer.

Polymers which have demonstrated the desired performance characteristics, are:

DESCRIPTION

I. Polydiallyl dimethyl ammonium chloride, such as CPS Chemical Company's Ageflex.
II. Condensation product of polyamine plus ethylene dichloride, such as Dow Purifloc C-31.
III. Condensation product of dimethylamine plus epichlorohydrin plus ethylene diamine, such as American Cyanamid Magnifloc 581C.
IV. Condensation product of diethylenetriamine plus adipic acid plus epichlorohydrin, such as Betz Polymer 1175.
V. Condensation product of dimethylaminopropylamine plus epichlorohydrin, such as described in U.S. Pat. No. 3,915,904 (Tonkyn, et al.).
VI. Condensation product of hexamethylenediamine still bottoms plus ethylene dichloride, such as Monsanto Santofloc F.
VII. Condensation product of dimethylamine plus epichlorohydrin, such as described in U.S. Pat. No. 3,738,945 (Panzer & Dixson).

The silicate ion may be provided by a number of different compounds. Water soluble salts of the following anions, such as the sodium, potassium and ammonium salts thereof, are particularly effective in providing the desired oil treatment results:
Metasilicate—$SiO_3^{2-}$
Orthosilicate—$SiO_4^{4-}$
Disilicate—$Si_2O_5^{-2}$
Mixed silicates—$Na_2O.xSiO_2$ (where x=1.6–5)

EXAMPLES

The following examples include compositions according to the present invention. They are intended to be illustrative of the claimed process and are not intended to limit the scope of coverage to be narrower than that which is described in the specifications in its entirety.

Tables I and II show results of tests using a synthetic wastewater consisting of 700 ppm Coray 2, a hydrocarbon oil containing about 8% anionic sulfonate surfactant. This synthetic wastewater was originally used to investigate the feasibility of silicate-based water treatments.

Oil contaminated water was added to standard laboratory sample jars. The indicated treatment was added thereafter. Treatment efficacy is determined from turbidity levels in the post-treatment water. The lower the turbidity, measured in NTU, the more efficient the treatment program. Values of >200 indicated turbidity levels in excess of 200 NTU; the turbidimeter used does not provide quantitative values above 200.

Table I contains the results of tests in which several treatments were evaluated using Coray 2 synthetic oily wastewater.

TABLE I

Effect of Chemical Treatments on Supernatant Quality Of Coray 2 Synthetic Oily Wastewater

| Chemical Treatment | Turbidity (ntu) |
| --- | --- |
| Control | >200 |
| 50 ppm polymer III | >200 |
| 100 ppm polymer III | >200 |
| 200 ppm polymer III | >200 |
| 250 ppm polymer III | >200 |
| 300 ppm polymer III | >200 |
| 500 ppm polymer III | >200 |
| 800 ppm polymer III | >200 |
| 1000 ppm polymer III | >200 |
| 1250 ppm polymer III | >200 |
| 1500 ppm polymer III | >200 |
| 50 ppm polymer III + 1800 ppm silicate | >200 |
| 50 ppm polymer III + 2000 ppm silicate | >200 |
| 50 ppm polymer III + 2200 ppm silicate | >200 |
| 100 ppm polymer III + 1450 ppm silicate | 65 |
| 100 ppm polymer III + 1600 ppm silicate | 56 |
| 100 ppm polymer III + 1800 ppm silicate | 58 |
| 100 ppm polymer III + 2000 ppm silicate | 49 |
| 100 ppm polymer III + 2200 ppm silicate | 56 |
| 150 ppm polymer III + 1800 ppm silicate | 72 |
| 150 ppm polymer III + 2000 ppm silicate | 57 |
| 150 ppm polymer III + 2200 ppm silicate | 40 |
| 150 ppm polymer III + 2400 ppm silicate | 46 |
| 200 ppm polymer III + 1600 ppm silicate | 185 |
| 200 ppm polymer III + 1800 ppm silicate | 87 |
| 200 ppm polymer III + 2000 ppm silicate | 128 |
| 200 ppm polymer III + 2200 ppm silicate | 118 |
| 200 ppm polymer III + 2400 ppm silicate | 111 |
| 300 ppm polymer III + 1600 ppm silicate | >200 |
| 300 ppm polymer III + 1800 ppm silicate | >200 |
| 300 ppm polymer III + 2000 ppm silicate | >200 |
| 100 ppm silicate | >200 |
| 200 ppm silicate | >200 |
| 400 ppm silicate | >200 |
| 600 ppm silicate | >200 |
| 800 ppm silicate | >200 |
| 1000 ppm silicate | >200 |
| 1250 ppm silicate | >200 |
| 1500 ppm silicate | >200 |
| 2000 ppm silicate | >200 |
| 2500 ppm silicate | >200 |
| 25 ppm Al compound | >200 |
| 50 ppm Al compound | >200 |
| 75 ppm Al compound | >200 |
| 100 ppm Al compound | 105 |
| 200 ppm Al compound | 18 |

Note:
All Al compound treated samples pH adjusted to 6.5.
polymer III: condensation product of dimethylamine plus epichlorohydrin plus ethylenediamine
silicate: sodium silicate having a weight ratio $SiO_2/Na_2O$ of 2.0/1
Al compound: $Al_2(SO_4)_3 \cdot 13 H_2O$ Listed in Table II are the results of tests in which premixed blends of polymer III and silicate were used as treatments for the synthetic substrate. Each of the treatment blends had a polymer/silicate concentration ratio of 150 ppm/2200 ppm=0.068. It can be seen that several of the blend feedrates were effective in reducing supernatant turbidity.

The data in Table II also suggest that the extent of dilution of the treatment during addition is important. For example, the neat (or undiluted) blend, added at a feedrate of 159.5 ppm polymer III and 2340 ppm silicate was ineffective, while an equivalent blend dosage, first diluted twofold with water, displayed good effectiveness. This difference could be due to inadequate dispersion of the neat blend after introduction to the jar sample.

TABLE II

Results of Tests Using Preblended polymer III/silicate Mixtures at a Blend Ratio of 0.068

| Treatment Addition Form | polymer III | silicate ppm | Turbidity (ntu) |
| --- | --- | --- | --- |
| 50/50 neat blend/$H_2O$ | 63.8 | 936 | >200 |
| 50/50 neat blend/$H_2O$ | 95.7 | 1404 | 54 |
| 50/50 neat blend/$H_2O$ | 127.6 | 1872 | 48 |
| 50/50 neat blend/$H_2O$ | 159.5 | 2340 | 26 |
| 50/50 neat blend/$H_2O$ | 319 | 4680 | >200 |

TABLE II-continued

Results of Tests Using Preblended polymer III/silicate Mixtures at a Blend Ratio of 0.068

| Treatment Addition Form | polymer III | silicate ppm | Turbidity (ntu) |
|---|---|---|---|
| 50/50 neat blend/H₂O | 159.5 | 2340 | 19 |
| Neat blend | 159.5 | 2340 | >200 |
| Neat blend | 319 | 4680 | >200 | polymer III: condensation product of dimethylamine plus epichlorohydrin plus ethylene diamine
Silicate: sodium silicate having a weight ratio $SiO_2/Na_2O$ of 2.0/1

The following tests were conducted using effluent water from a steel coil treating industrial facility in Pennsylvania. The water contained a high degree of emulsified oil particles which were well dispersed. As a result, the turbidity was high, in excess of 200 NTU, as measured by known methods on a standard turbidimeter.

Table III compares the efficacies of polymer, silicate, an aluminum compound and select combinations thereof.

TABLE III

Comparative Treatments on Industrial Wastewater

| CHEMICAL TREATMENT | TURBIDITY (ntu) |
|---|---|
| 20 ppm polymer VII | >200 |
| 30 ppm polymer VII | >200 |
| 40 ppm polymer VII | 78 |
| 60 ppm polymer VII | 58 |
| 80 ppm polymer VII | 49 |
| 100 ppm polymer VII | 41 |
| 120 ppm polymer VII | 48 |
| 140 ppm polymer VII | 35 |
| 160 ppm polymer VII | 37 |
| 180 ppm polymer VII | 40 |
| 200 ppm polymer VII | 51 |
| 100 ppm Al compound | >200 |
| 200 ppm Al compound | >200 |
| 300 ppm Al compound | >200 |
| 400 ppm Al compound | 105 |
| 10 ppm silicate | >200 |
| 25 ppm silicate | >200 |
| 50 ppm silicate | >200 |
| 75 ppm silicate | >200 |
| 100 ppm silicate | >200 |
| 150 ppm silicate | >200 |
| 200 ppm silicate | >200 |
| 300 ppm silicate | >200 |
| 30 ppm polymer + 100 ppm silicate | 12 |
| 30 ppm polymer + 100 Al compound (pH adjusted to 6.5) | 99 | polymer VII: Condensation product of dimethylamine plus epichlorohydrin
silicate: Sodium silicate having a weight ratio $SiO_2/Na_2O$ of 3.22/1
Al compound: $Al_2(SO_4)_3 \cdot 13\ H_2O$ It is evident that treatment with the polymer alone provided some effectiveness. The aluminum compound only began to show efficacy at higher concentrations. The silicate was ineffective when used by itself. Clearly, the most effective treatment was the combination of cationic polymer and silicate. This composition was superior to the efficacies of each compound individually and performed better than the aluminum compound/silicate composition even after the requisite pH adjustment.

Table IV illustrates the relative pH dependence of cationic polymer/silicate and cationic polymer/aluminum compound treatments.

TABLE IV

| CHEMICAL TREATMENT | pH INITIAL | pH FINAL | TURBIDITY (ntu) |
|---|---|---|---|
| 30 ppm polymer + 100 ppm silicate | 2.1 | 2.3 | 84 |
| 30 ppm polymer + 100 ppm silicate | 5.0 | 6.3 | >200 |
| 30 ppm polymer + 100 ppm silicate | 9.0 | 9.4 | 12 |
| 30 ppm polymer + 100 ppm silicate | 11.0 | 10.5 | >200 |
| 30 ppm polymer + 100 ppm Al compound* | 2.1 | 6.6 | 99 |
| 30 ppm polymer + 100 ppm Al compound* | 5.0 | 6.8 | >200 |
| 30 ppm polymer + 100 ppm Al compound* | 9.0 | 6.6 | 174 |
| 30 ppm polymer + 100 ppm Al compound* | 11.0 | 7.0 | 106 |
| 30 ppm polymer + 100 ppm Al compound | 2.0 | 2.2 | 105 |
| 30 ppm polymer + 100 ppm Al compound | 5.0 | 5.2 | >200 |
| 30 ppm polymer + 100 ppm Al compound | 9.0 | 8.7 | 46 |
| 30 ppm polymer + 100 ppm Al compound | 11.0 | 10.4 | 25 |

*final pH adjusted to 6.5
polymer: (VII) - condensation product of dimethylamine plus epichlorohydrin
silicate: Sodium silicate having a weight ratio $SiO_2/Na_2O$ of 3.22/1
Al compound: $Al_2(SO_4)_3 \cdot 13\ H_2O$ Table IV indicates that the silicate based treatment is the most effective at pH values of 2 and 9, while the aluminum based treatment (without final pH adjustment) was the most effective at a pH of 11. None of the treatments were effective at a pH of 5. It should be noted that variations in the relative amounts of polymer and silicate used in a given treatment application may result in changes in pH dependence and optimum pH operating range.

Table V contains the results of a test series that was conducted to determine whether pH variations alone were responsible for the activity of a silicate based treatment program. As is evident, the treatment is ineffective with polymer and pH adjustment alone. Only the polymer/silicate program provides the most efficacious treatment.

TABLE V

| CHEMICAL TREATMENT | pH FINAL | TURBIDITY (ntu) |
|---|---|---|
| 30 ppm polymer + 100 ppm silicate | 8.3 | 39 |
| 30 ppm polymer + 20 ppm NaOH | 8.3 | >200 |
| 30 ppm polymer + 40 ppm NaOH | 8.8 | >200 |
| 30 ppm polymer + 100 ppm NaOH | 9.75 | >200 |
| 30 ppm polymer + 300 ppm NaOH | 11.03 | >200 | polymer: (VII) - condensation product of dimethylamine plus epichlorohydrin
silicate: Sodium silicate having a weight ratio $SiO_2/Na_2O$ of 3.22/1

While the invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method for coagulating emulsified oil contaminants in effluent water discharged from metal processing operations having a turbidity greater than 200 (NTU) comprising adding to said water a sufficient amount for the purpose and in a concentration of from about 10 to about 300 parts per million of a cationic polymer condensation product of dimethylamine plus epichlorohydrin concurrent with sodium silicate having the formula: $Na_2 \cdot xSiO_2$, where $x = 1.6-5$, wherein the weight ratio of said cationic polymer to said sodium silicate is between about 1 to 1 and 1 to 20, respectively, and wherein the emulsified oil is coagulated and the turbidity of said effluent water is reduced.

* * * * *